(12) United States Patent
Kubota et al.

(10) Patent No.: US 9,581,246 B2
(45) Date of Patent: Feb. 28, 2017

(54) SEAL MEMBER AND FRONT FORK PROVIDED WITH SEAL MEMBER

(71) Applicant: KAYABA INDUSTRY CO., LTD., Tokyo (JP)

(72) Inventors: Naoki Kubota, Gifu (JP); Kiyoshi Kani, Gifu (JP); Chikashi Imoto, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/763,638

(22) PCT Filed: Feb. 20, 2014

(86) PCT No.: PCT/JP2014/053983
§ 371 (c)(1),
(2) Date: Jul. 27, 2015

(87) PCT Pub. No.: WO2014/132867
PCT Pub. Date: Sep. 4, 2014

(65) Prior Publication Data
US 2015/0362075 A1    Dec. 17, 2015

(30) Foreign Application Priority Data
Feb. 28, 2013   (JP) ................................. 2013-038675

(51) Int. Cl.
*B62K 21/02*   (2006.01)
*F16J 15/32*   (2016.01)
*F16F 9/36*   (2006.01)

(52) U.S. Cl.
CPC ........... *F16J 15/3216* (2013.01); *B62K 21/02* (2013.01); *F16F 9/36* (2013.01); *F16F 9/362* (2013.01); *F16J 15/32* (2013.01); *F16J 15/3252* (2013.01)

(58) Field of Classification Search
CPC ...... F16J 15/3216; F16J 15/32; F16J 15/3252; B62K 21/02; F16F 9/36
See application file for complete search history.

(56) References Cited

U.S. PATENT DOCUMENTS

2013/0001889 A1* 1/2013 Scaramozzino ..... F16J 15/3216
277/561
2014/0216872 A1* 8/2014 Kani ........................ F16F 9/36
188/322.16

(Continued)

FOREIGN PATENT DOCUMENTS

DE           3019736 B1   6/1981
DE     102011080748 A1   2/2013

(Continued)

*Primary Examiner* — Kevin Hurley
*Assistant Examiner* — Marlon A Arce
(74) *Attorney, Agent, or Firm* — Rabin & Berdo, P.C.

(57) ABSTRACT

A seal member includes an annular fitting part and an annular dust lip. The fitting part fits on an inner circumference of a tubular member. The dust lip extends from the fitting part toward a side opposite from the tubular member such that a diameter of an inner circumference of the dust lip gradually decreases, and a distal end portion of the dust lip slides on an outer circumferential surface of a shaft member. A metal insert includes a reinforcing ring and a reinforcing extension piece. The reinforcing ring stands along the inner circumference of the tubular member. The reinforcing extension piece extends from the reinforcing ring toward a side opposite from the tubular member, and inclines such that a distal end of the reinforcing extension piece approaches the shaft member. The reinforcing ring is arranged in the fitting part, whereas the reinforcing extension piece is arranged in the dust lip.

8 Claims, 3 Drawing Sheets

(56) References Cited

U.S. PATENT DOCUMENTS

| | | | |
|---|---|---|---|
| 2016/0003302 A1* | 1/2016 | Seno | F16J 15/3264 |
| | | | 277/351 |
| 2016/0010750 A1* | 1/2016 | Colineau | F16J 15/3236 |
| | | | 277/565 |

FOREIGN PATENT DOCUMENTS

| | | |
|---|---|---|
| JP | 56-097643 U | 8/1981 |
| JP | 57-124662 U | 8/1982 |
| JP | 2008-240733 A | 10/2008 |
| JP | 2012-167698 A | 9/2012 |
| JP | 2012-180883 A | 9/2012 |
| JP | 2013-002622 A | 1/2013 |

* cited by examiner

SEAL MEMBER AND FRONT FORK PROVIDED WITH SEAL MEMBER

TECHNICAL FIELD

The present invention relates to a seal member and a front fork provided with the seal member.

BACKGROUND ART

A shock absorber, a cylinder device, and the like include a tubular member such as a cylinder, and a shaft member such as a piston rod. The shock absorber generates a damping force using a working fluid such as a working oil. The cylinder device drives a target object by the working fluid. The working fluid is housed in the tubular member. The shaft member is axially movably inserted into the tubular member. The shock absorber and the cylinder device are extendable and compressible due to relative movements between the tubular member and the shaft member. A seal member is provided between the tubular member and the shaft member. The seal member prevents the working fluid from leaking from the tubular member.

A shock absorber for a front fork which suspends a front wheel in a straddled vehicle such as a motorcycle includes a shock absorber main body made up of an outer tube (tubular member) and an inner tube (shaft member). The outer tube is joined to one of a vehicle body side and a vehicle wheel side. The inner tube is joined to the other of the vehicle body side and the vehicle wheel side, and is axially movably inserted into the outer tube. The shock absorber main body houses a working fluid therein, and includes a seal member which seals an opening of a tubular gap on an outer air side, the tubular gap being formed in a portion where the outer tube and the inner tube overlap.

In the front fork, mud, sand, and the like (hereinafter referred to as "foreign substances") easily adhere to an outer circumferential surface of the inner tube while the vehicle is running. JP 2013-002622A and JP 2012-180883A disclose a seal member for an oil seal and a seal member for a dust seal which are arranged in series. The seal member for an oil seal includes an oil lip which prevents a working fluid inside a shock absorber main body from flowing out, whereas the seal member for a dust seal includes a dust lip which scrapes off foreign substances adhering to an outer circumferential surface of an inner tube. In this way, the seal member for a dust seal scrapes off the foreign substances. This makes it possible to not only prevent the foreign substances from entering the inside of the shock absorber main body, but also prevent the working fluid from leaking externally due to damage to a sliding surface of the oil lip caused by the foreign substances adhering to the inner tube.

Also, in the foregoing front fork, the inner tube may bend or incline with respect to the outer tube due to application of an external force. In view of this, by increasing the length of a dust lip, the dust lip more highly conforms to the inner tube. The high conformity suppresses the dust lip from being separated from the inner tube and thus being placed in an open state.

SUMMARY OF INVENTION

The dust lip is made of an elastic body such as rubber and is pressed against the outer circumferential surface of the inner tube due to interference with respect to the inner tube. Therefore, if the dust lip hardens due to deterioration, there is a possibility that the conformity with the inner tube decreases.

Also, it is preferable that an angle of inclination of the dust lip with respect to the inner tube is small (nearly parallel) in order to make it easy to scrape off foreign substances and to prevent a distal end of the dust lip from being rolled and dragged toward an outer tube side by the inner tube when the inner tube proceeds into the outer tube. In this case, there is a possibility that recurvation occurs. The recurvation warps the distal end of the dust lip to a direction away from the inner tube.

For this reason, a force application member which is called a garter spring may be attached to an outer circumference of the distal end portion of the dust lip so as to suppress a decrease in conformity and the recurvation.

However, the use of the garter spring leads to a cost increase. Also, the garter spring is a coil spring formed into an annular shape by connecting both ends thereof, the coil spring being a wire wound into a spiral shape. Hence, foreign substances are easily accumulated inside the garter spring. If the inside of the garter spring is filled with foreign substances, a fastening force applied by the garter spring decreases. Furthermore, a portion to which the garter spring is attached corresponds to the distal end portion of the dust lip, and it is necessary to increase the thickness of the distal end of the dust lip when the garter spring is attached. Therefore, if the distal end of the dust lip is oriented upward, foreign substances easily pile up on the distal end portion of the dust lip.

It is an object of the present invention to provide a seal member capable of suppressing a decrease in conformity with a shaft member such as an inner tube and recurvation even if a garter spring is not attached to a dust lip, and to provide a front fork provided with this seal member.

According to one aspect of the present invention, a seal member which is formed of a metal insert and an elastic body covering the metal insert and seals a gap between a tubular member and a shaft member axially movably inserted into the tubular member includes: an annular fitting part which fits on an inner circumference of the tubular member; and an annular dust lip which extends from the fitting part toward a side opposite from the tubular member, a diameter of an inner circumference of the dust lip gradually decreases, with a distal end portion of the dust lip sliding on an outer circumferential surface of the shaft member. The metal insert includes a reinforcing ring and a reinforcing extension piece, the reinforcing ring standing along the inner circumference of the tubular member, and the reinforcing extension piece extending from the reinforcing ring toward a side opposite from the tubular member and inclining such that a distal end of the reinforcing extension piece approaches the shaft member. The reinforcing ring is arranged in the fitting part, and the reinforcing extension piece is arranged in the dust lip.

DESCRIPTION OF EMBODIMENTS

Figure 1:
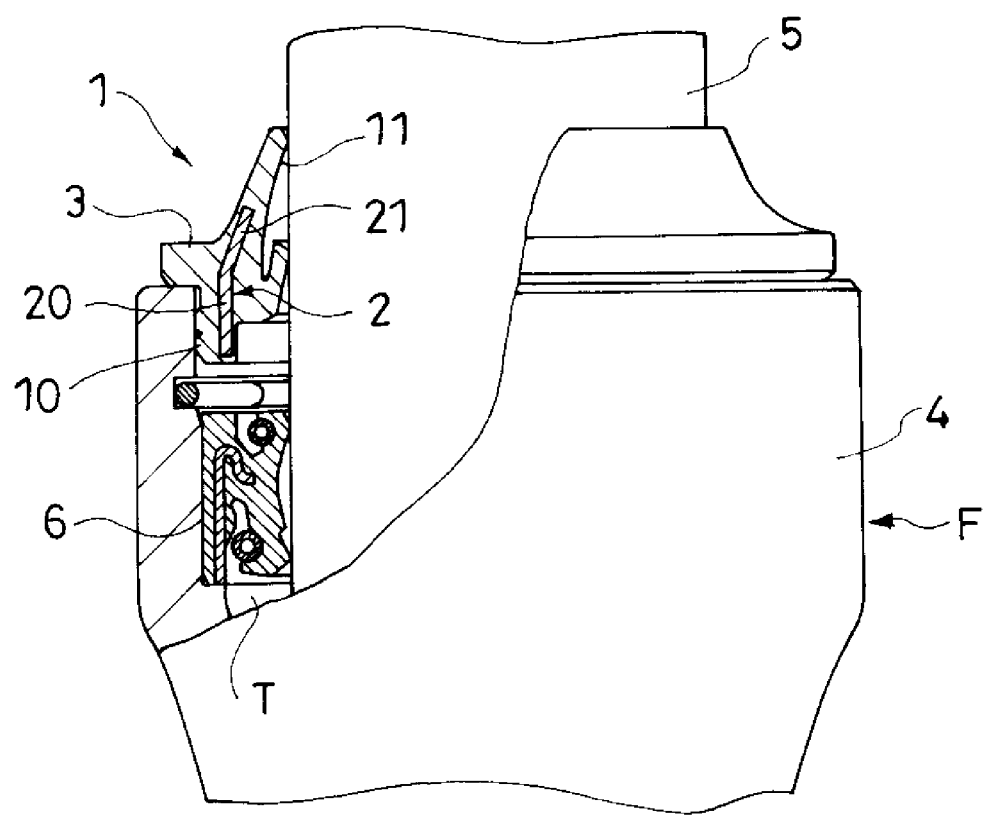
FIG. 1 is a partially cutaway front view of main parts of a front fork provided with a seal member according to a first embodiment of the present invention.

Hereinafter, embodiments of the present invention are described with reference to the drawings and the like.

The same reference numeral assigned throughout the drawings indicates the same component or a corresponding component(s).

First, a description is given of a first embodiment.

As shown in FIG. 1, a seal member 1 is formed of a metal insert 2 and an elastic body 3 which covers the metal insert 2. The seal member 1 seals a gap between an outer tube (tubular member) 4 and an inner tube (shaft member) 5 which is axially movably inserted into the outer tube 4. The seal member 1 includes an annular fitting part 10 and an annular dust lip 11. The fitting part 10 fits on an inner circumference of the outer tube 4. The dust lip 11 extends from the fitting part 10 toward a side opposite from the outer tube 4 (a side opposite from the tubular member) such that an inner circumference of the dust lip 11 gradually decreases in diameter, and a distal end portion of the dust lip 11 slides on an outer circumferential surface of the inner tube 5.

The metal insert 2 includes a reinforcing ring 20 and a reinforcing extension piece 21. The reinforcing ring 20 stands along the inner circumference of the outer tube (tubular member) 4. The reinforcing extension piece 21 extends from the reinforcing ring 20 toward a side opposite from the outer tube 4 (a side opposite from the tubular member), and inclines such that a distal end of the reinforcing extension piece 21 approaches the inner tube (shaft member) 5. The reinforcing ring 20 is arranged in the fitting part 10, whereas the reinforcing extension piece 21 is arranged in the dust lip 11.

The seal member 1 is used in a shock absorber for a suspension device called a front fork which suspends a front wheel in a straddled vehicle such as a motorcycle. Configurations of the front fork are well-known, and any configurations may be adopted. For example, the front fork includes a suspension spring and a shock absorber which are arranged in parallel. The suspension spring elastically supports a vehicle body. The shock absorber generates a damping force. In the front fork, the suspension spring absorbs shock which is input due to concavities and convexities on a road surface, and the shock absorber suppresses the extension and compression of the suspension spring. In this way, transmission of shock to the vehicle body is suppressed.

The shock absorber includes the outer tube 4 and the inner tube 5, and is extendable and compressible in a telescopic fashion. The outer tube 4 is joined to one of a vehicle body side and a vehicle wheel side. The inner tube 5 is joined to the other of the vehicle body side and the vehicle wheel side. The inner tube 5 is axially movably inserted into the outer tube 4. A shock absorber main body F is composed of the outer tube 4 and the inner tube 5. An opening of the shock absorber main body F on a vehicle body side is sealed by a cap member (not shown), and an opening of the shock absorber main body F on a vehicle wheel side is sealed by a bottom bracket (not shown) for joining the shock absorber to a vehicle axle of the front wheel. A tubular gap T is formed in a portion where the outer tube 4 and the inner tube 5 overlap. An opening of the tubular gap T on an outer air side is sealed by seal members 1, 6, and the inside of the shock absorber main body F is separated from the outer air.

A working oil serving as a working fluid, a damping force generation mechanism for generating a damping force by the working oil, the suspension spring, and the like are housed inside the shock absorber main body F. It should be noted that the working fluid is not limited to the working oil, and may be water, water solution, gas, and the like. Also, configurations of the damping force generation mechanism are well-known, and any configurations may be adopted.

An annular bearing (not shown) for supporting the inner tube 5 about an axis thereof is provided in the tubular gap T. Also, a working oil serving as a lubricant that lubricates a sliding surface of the bearing is housed in the tubular gap T. The seal members 1, 6 which seal the opening of the tubular gap T on the outer air side are arranged in series. The seal member 6 is arranged on an outer tube side (a lower side in FIG. 1), and is used as an oil seal that prevents the working oil from leaking. The seal member 1 is arranged on an outer air side, i.e., a side opposite from the outer tube 4 (an upper side in FIG. 1). The seal member 1 is used as a dust seal that not only prevents foreign substances adhering to the outer circumferential surface of the inner tube 5 from entering the inside of the shock absorber main body F by scraping off the foreign substances, but also prevents the working oil inside the shock absorber main body F from leaking due to damaging the seal member 6 serving as the oil seal by the foreign substances. It should be noted that a liquid different from the working oil (working fluid), grease, and the like may be used as the lubricant.

Figure 2:
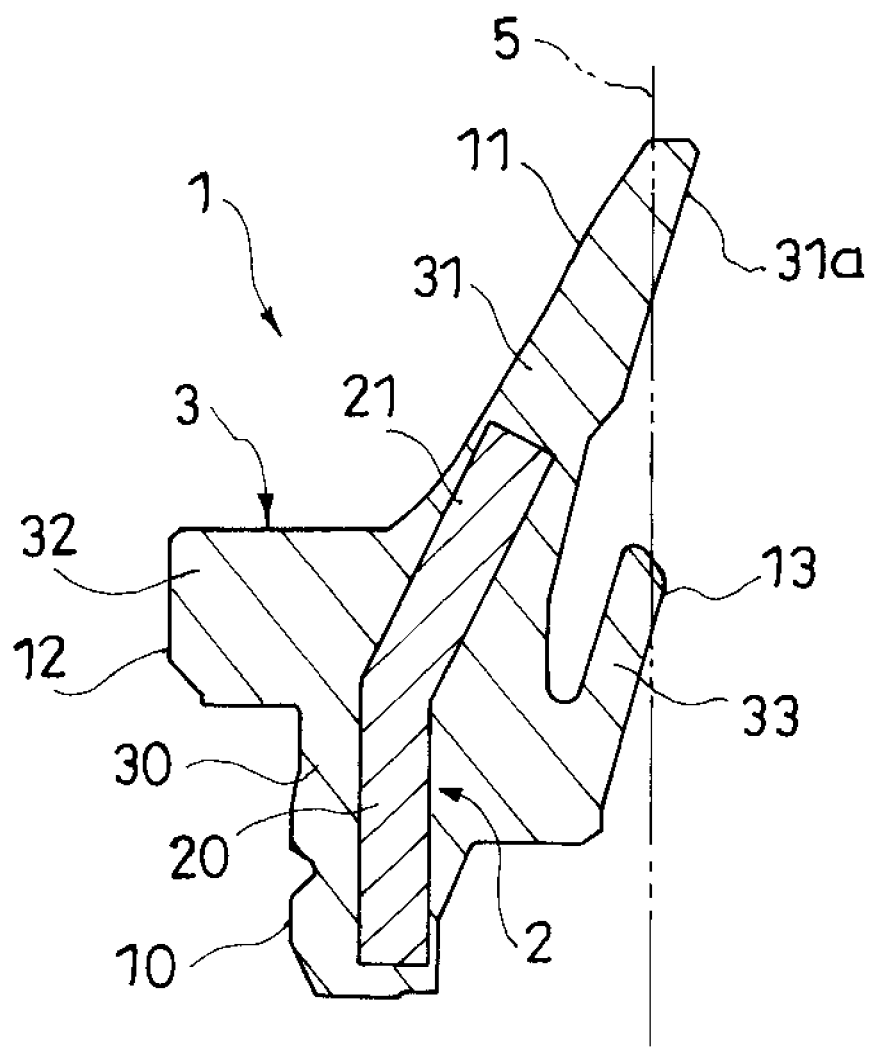
FIG. 2 is an enlarged cross-sectional view of the seal member according to the first embodiment of the present invention.

As shown in FIG. 2, the seal member 1 is made by covering the metal insert 2, which is made of metal, with the elastic body 3 such as rubber. The metal insert 2 serves as a metal core for reinforcing the elastic body 3 which practically serves as a seal. The seal member 1 is formed by insert molding. At the time of molding, the metal insert 2 and the elastic body 3 are integrated by bonding. In a case where the seal member 1 is mounted on the outer tube 4, the metal insert 2 includes the reinforcing ring 20 which stands along the inner circumference of the outer tube 4, and the annular reinforcing extension piece 21 which is continuous with an end portion of the reinforcing ring 20 on a side opposite from the outer tube 4 (an upper end portion in FIG. 2). The annular reinforcing extension piece 21 extends in a direction away from the reinforcing ring 20 such that a diameter of an inner circumference of a diameter of the reinforcing extension piece gradually decreases. In this way, the reinforcing extension piece 21 inclines such that the distal end (an upper end in FIG. 2) thereof approaches the inner tube 5.

It should be noted that the reinforcing extension piece 21 may not be formed into an annular shape. For example, the reinforcing extension piece 21 may be composed of a plurality of plate bodies which incline such that distal ends thereof approach the inner tube 5. Also, the reinforcing ring 20 and the reinforcing extension piece 21 may be formed as separate bodies and used in combination.

The seal member 1 includes the annular fitting part 10, the annular dust lip 11, an annular stopper part 12, and an annular sub-dust lip 13. The fitting part 10 fits on the inner circumference of the outer tube 4. The dust lip 11 extends from an upper end of the fitting part 10 in FIG. 2 toward a side opposite from the outer tube 4 (an upper side in FIG. 2) such that a diameter of the inner circumference of the dust lip 11 gradually decreases, and the distal end portion of the dust lip 11 slides on the outer circumferential surface of the inner tube 5. The stopper part 12 projects from an end portion of the fitting part 10 on a side opposite from the outer tube 4 (an upper end portion in FIG. 2) toward an outer circumferential side. The sub-dust lip 13 extends from a substantial center of an inner circumference of the fitting part 10 toward a side opposite from the outer tube 4 (the upper side in FIG. 2) such that that a diameter of an inner circumference of the sub-dust lip 13 gradually decreases, and a distal end portion thereof slides on the outer circumferential surface of the inner tube 5.

The reinforcing ring 20 of the metal insert 2 is arranged in the fitting part 10 of the seal member 1. An outer circumferential seal part 30 of the elastic body 3 covers the reinforcing ring 20. Together with the reinforcing ring 20, the outer circumferential seal part 30 forms the fitting part 10. An outer circumferential side of the outer circumferential seal part 30 elastically deforms by being compressed between the metal insert 2 and the outer tube 4, and is in tight contact with an inner circumferential surface of the outer tube 4. This seals a gap between the outer tube 4 and the seal member 1.

The reinforcing extension piece 21 of the metal insert 2 is arranged in a proximal end portion of the dust lip 11 of the seal member 1 on a fitting part side (a lower side in FIG. 2). An inner circumferential seal part 31 of the elastic body 3 covers the reinforcing extension piece 21. Together with the reinforcing extension piece 21, the inner circumferential seal part 31 forms the dust lip 11. A portion 31a of the inner circumferential seal part 31 extends from the reinforcing extension piece 21 toward the upper side in FIG. 2, and forms the distal end portion of the dust lip 11. The portion 31a slides on the outer circumferential surface of the inner tube 5, and has a predetermined interference with respect to the inner tube 5. This not only seals a gap between the inner tube 5 and the seal member 1, but also allows the dust lip 11 to scrape off foreign substances adhering to the outer circumferential surface of the inner tube 5. It should be noted that the length of the reinforcing extension piece 21 can be changed as appropriate. However, it is necessary that a movable range of the portion 31a of the elastic body 3 which moves in conformity with the inner tube 5 can be secured, and a relative movement between the inner tube 5 and the dust lip 11 are not hindered.

The metal insert 2 is not arranged in the stopper part 12 of the seal member 1. The stopper part 12 is formed only of the elastic body 3. A distal end seal part 32 is a part of the elastic body 3 which forms the stopper part 12. A lower side of the distal end seal part 32 in FIG. 2 is in tight contact with a distal end of the outer tube 4 by being pressed. This seals the gap between the outer tube 4 and the seal member 1.

The metal insert 2 is not arranged in the sub-dust lip 13 of the seal member 1. The sub-dust lip 13 is formed only of the elastic body 3. An inner circumferential second seal part 33 is a part of the elastic body 3 which forms the sub-dust lip 13. A portion of the inner circumferential second seal part 33 which forms the distal end portion of the sub-dust lip 13 slides on the outer circumferential surface of the inner tube 5, and has a predetermined interference with respect to the inner tube 5. This not only seals the gap between the inner tube 5 and the seal member 1, but also allows the sub-dust lip 13 to scrape off foreign substances adhering to the outer circumferential surface of the inner tube 5. Also, a recess formed between the inner circumferential seal part 31 and the inner circumferential second seal part 33 serves as a collection part in which foreign substances are collected in a case where the foreign substances have moved toward the lower side in FIG. 2 past the inner circumferential seal part 31.

A description is now given of the operational effects of the seal member 1 according to the present embodiment.

The seal member 1 is formed of the metal insert 2 and the elastic body 3 which covers the metal insert 2. The seal member 1 seals the gap between the outer tube (tubular member) 4 and the inner tube (shaft member) 5 which is axially movably inserted into the outer tube 4. Also, the seal member 1 includes the annular fitting part 10 and the annular dust lip 11. The fitting part 10 fits on the inner circumference of the outer tube 4. The dust lip 11 extends from the fitting part 10 toward a side opposite from the outer tube 4 (a side opposite from the tubular member) in such a manner that the inner circumference thereof gradually decreases in diameter, and the distal end portion thereof slides on the outer circumferential surface of the inner tube 5.

The metal insert 2 includes the reinforcing ring 20 and the reinforcing extension piece 21. The reinforcing ring 20 stands along the inner circumference of the outer tube (tubular member) 4. The reinforcing extension piece 21 extends from the reinforcing ring 20 toward a side opposite from the outer tube 4 (a side opposite from the tubular member), and inclines such that the distal end of the reinforcing extension piece 21 approaches the inner tube (shaft member) 5. The reinforcing ring 20 is arranged in the fitting part 10, whereas the reinforcing extension piece 21 is arranged in the dust lip 11.

In this way, in the seal member 1, the proximal end portion of the dust lip 11 located on the fitting part side (the lower side in FIGS. 1 and 2) is reinforced by the reinforcing extension piece 21 of the metal insert 2. This makes it possible to guide the dust lip 11 such that the distal end portion thereof is oriented toward an inner tube side (inward), even if the dust lip 11 has a sufficient length and an angle of inclination thereof with respect to the inner tube 5 is small. Consequently, a decrease in conformity with the inner tube (shaft member) 5 and recurvation can be suppressed without attaching a garter spring to the dust lip 11.

Furthermore, as the reinforcing extension piece 21 is covered by the elastic body 3, accumulation of foreign substances, as in the case of the garter spring, can be prevented. Moreover, as the garter spring can be eliminated, the cost can be reduced, and there is no need to increase the thickness of the distal end portion of the dust lip 11 to mount the garter spring. Therefore, even though a distal end of the dust lip 11 is oriented upward, accumulation of foreign substances on the distal end of the dust lip 11 can be prevented.

Furthermore, the reinforcing extension piece 21 is formed into an annular shape and the diameter of the reinforcing extension piece 21 gradually decreases toward the distal end of the reinforcing extension piece 21. The metal insert 2 is composed of the reinforcing ring 20 and the reinforcing extension piece 21.

Therefore, even though the metal insert 2 extends from the fitting part 10 to the dust lip 11 of the seal member 1, complication of the shape of the metal insert 2 can be prevented, and a process for forming the metal insert 2 can be simplified.

Furthermore, the seal member 1 is used in a front fork and seals the gap between the outer tube 4 and the inner tube 5, which are the tubular member and the shaft member, respectively.

Especially, because the front fork is arranged in a front-side part of a vehicle, foreign substances easily adhere thereto while the vehicle is running. In a case where a garter spring is provided, foreign substances are easily accumulated inside the garter spring. The seal member 1 according to the present embodiment is capable of suppressing of a decrease in conformity with the inner tube (shaft member) 5 and recurvation without attaching the garter spring to the dust lip 11.

Furthermore, the seal member 1 includes the annular stopper part 12. The stopper part 12 projects from the end portion of the fitting part 10 on a side opposite from the outer tube 4 (a side opposite from the tubular member) toward an outer circumferential side, and is pressed against the distal end of the outer tube (tubular member) 4. Therefore, the seal member 1 can be positioned with ease. Furthermore, the stopper part 12 is made of the elastic body 3 and is in tight contact with the distal end of the outer tube 4 by being appressed thereto. This makes it possible to reliably seal the gap between the outer tube 4 and the seal member 1.

Furthermore, the seal member 1 includes the annular sub-dust lip 13. The sub-dust lip 13 extends from the substantial center of the inner circumference of the fitting part 10 toward a side opposite from the outer tube 4 (a side opposite from the tubular member) such that the inner circumference of gradually decreases in diameter, and the distal end portion thereof slides on the outer circumferential surface of the inner tube (shaft member) 5. In this way, not only the dust lip 11 but also the sub-dust lip 13 can scrape off foreign substances adhering to the outer circumferential surface of the inner tube 5.

A second embodiment will now be described.

Figure 3:
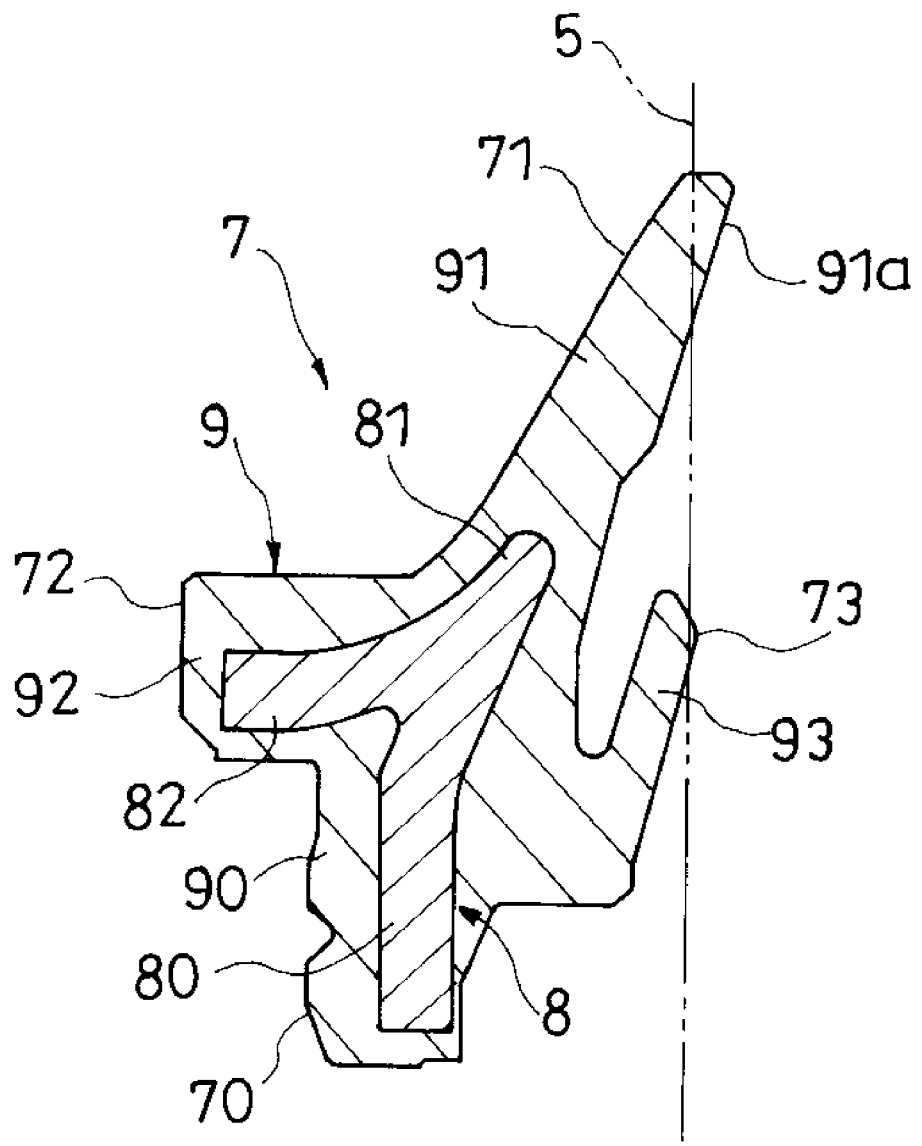
FIG. 3 is an enlarged cross-sectional view of a seal member according to a second embodiment of the present invention.

As shown in FIG. 3, similarly to the seal member 1 according to the first embodiment, a seal member 7 is used in a front fork and serves as a dust seal which seals the gap between an outer tube 4 and an inner tube 5. Similarly to the seal member 1 according to the first embodiment, the seal member 7 is formed by insert molding, and is made by covering a metal insert 8, which is made of metal, with an elastic body 9 such as rubber. The metal insert 8 serves as a metal core for reinforcing the elastic body 9 which practically functions as a seal.

In a case where the seal member 7 is mounted on the outer tube 4, the metal insert 8 is made up of a reinforcing ring 80, an annular reinforcing extension piece 81, and a reinforcing flange piece 82 having a shape of an annular plate. The reinforcing ring 80 stands along an inner circumference of the outer tube 4. The reinforcing extension piece 81 is continuous with an end portion of the reinforcing ring 80 on a side opposite from the outer tube 4 (an upper end portion in FIG. 3), and extends in a direction away from the reinforcing ring 80 such that a diameter of an inner circumference of the reinforcing extension piece 81 gradually decreases. The reinforcing flange piece 82 projects from the end portion of the reinforcing ring 80 on a side opposite from the outer tube 4 (the upper end portion in FIG. 3) toward an outer circumferential side.

Similarly to the reinforcing extension piece 21 according to the first embodiment, the reinforcing extension piece 81 inclines such that a distal end (an upper end in FIG. 3) of the reinforcing extension piece 81 approaches the inner tube 5. The metal insert 8 is formed such that the reinforcing extension piece 81 is formed by bending an inner circumferential portion of a washer having a shape of an annular plate in a direction substantially perpendicular to an outer circumferential portion of the washer, and by obliquely elongating the bent portion inward. The inner circumferential portion and the outer circumferential portion of the washer serve as the reinforcing ring 80 and the reinforcing flange piece 82, respectively. It should be noted that a method for forming the metal insert 8 is not limited to the above-described method, and can be changed as appropriate.

Similarly to the first embodiment, the seal member 7 includes an annular fitting part 70, an annular dust lip 71, an annular stopper part 72, and an annular sub-dust lip 73. The fitting part 70 fits on the inner circumference of the outer tube 4. The dust lip 71 extends from an upper end of the fitting part 70 in FIG. 3 toward a side opposite from the outer tube 4 (an upper side in FIG. 3) such that a diameter of an inner circumference of the dust lip 71 gradually decreases, and a distal end portion of the dust lip 71 slides on an outer circumferential surface of the inner tube 5. The stopper part 72 projects from an end portion of the fitting part 70 on a side opposite from the outer tube 4 (an upper end portion in FIG. 3) toward an outer circumferential side. The sub-dust lip 73 extends from a substantial center of an inner circumference of the fitting part 70 toward a side opposite from the outer tube 4 (the upper side in FIG. 3) such that a diameter of an inner circumference of the sub-dust lip 73 gradually decreases, and a distal end portion of the sub-dust lip 73 slides on the outer circumferential surface of the inner tube 5.

Similarly to the first embodiment, the reinforcing ring 80 of the metal insert 8 is arranged in the fitting part 70 of the seal member 7. An outer circumferential seal part 90, which is a part of the elastic body 9, covers the reinforcing ring 80. Together with the reinforcing ring 80, the outer circumferential seal part 90 forms the fitting part 70. An outer circumferential side of the outer circumferential seal part 90 elastically deforms by being compressed between the metal insert 8 and the outer tube 4, and is in tight contact with an inner circumferential surface of the outer tube 4. This seals a gap between the outer tube 4 and the seal member 7.

Similarly to the first embodiment, the reinforcing extension piece 81 of the metal insert 8 is arranged in a proximal end portion of the dust lip 71 of the seal member 7 on a fitting part side (a lower side in FIG. 3). An inner circumferential seal part 91, which is a part of the elastic body 9, covers the reinforcing extension piece 81. Together with the reinforcing extension piece 81, the inner circumferential seal part 91 forms the dust lip 71. A portion 91a of the inner circumferential seal part 91 extends from the reinforcing extension piece 21 toward the upper side in FIG. 3, and composes the distal end portion of the dust lip 71. The portion 91a slides on the outer circumferential surface of the inner tube 5, and has a predetermined interference with respect to the inner tube 5. This not only seals a gap between the inner tube 5 and the seal member 7, but also allows the dust lip 71 to scrape off foreign substances adhering to the outer circumferential surface of the inner tube 5. It should be noted that the length of the reinforcing extension piece 81 can be changed as appropriate. However, it is necessary that a movable range of the portion 91a of the elastic body 9 which moves in conformity with the inner tube 5 can be secured, and a relative movement between the inner tube 5 and the dust lip 71 are not hindered.

The reinforcing flange piece 82 of the metal insert 8 is arranged in the stopper part 72 of the seal member 7. A distal end seal part 92 which is a part of the elastic body 9 covers the reinforcing flange piece 82. Together with the reinforcing flange piece 82, the distal end seal part 92 forms the stopper part 72. A lower side of the distal end seal part 92 in FIG. 3 is in tight contact with a distal end of the outer tube 4 by being pressed. This seals the gap between the distal end of the outer tube 4 and the seal member 7.

Similarly to the first embodiment, the metal insert 8 is not arranged in the sub-dust lip 73. The sub-dust lip 73 is formed only of the elastic body 9. An inner circumferential second seal part 93 is a part of the elastic body 9 which forms the sub-dust lip 73. A portion of the inner circumferential second seal part 93 which forms the distal end portion of the sub-dust lip 73 slides on the outer circumferential surface of the inner tube 5, and has a predetermined interference with respect to the inner tube 5. This not only seals the gap between the inner tube 5 and the seal member 7, but also allows the sub-dust lip 73 to scrape off foreign substances adhering to the outer circumferential surface of the inner tube 5. Also, a recess formed between the inner circumferential seal part 91 and the inner circumferential second seal part 93 serves as a part in which foreign substances are collected in a case where the foreign substances have moved toward the lower side in FIG. 3 past the inner circumferential seal part 91.

A description is now given of the operational effects of the seal member 7 according to the present embodiment.

The seal member 7 is formed of the metal insert 8 and the elastic body 9 which covers the metal insert 8. The seal member 7 seals the gap between the outer tube (tubular member) 4 and the inner tube (shaft member) 5 which is axially movably inserted into the outer tube 4. Also, the seal member 7 includes the annular fitting part 70 and the annular dust lip 71. The fitting part 70 fits on the inner circumference of the outer tube 4. The dust lip 71 extends from the fitting part 70 toward a side opposite from the outer tube 4 (a side opposite from the tubular member) such that the diameter of an inner circumference of the dust lip gradually decreases, and the distal end portion of the dust lip slides on the outer circumferential surface of the inner tube 5.

The metal insert 8 includes the reinforcing ring 80 and the reinforcing extension piece 81. The reinforcing ring 80 stands along the inner circumference of the outer tube (tubular member) 4. The reinforcing extension piece 81 extends from the reinforcing ring 80 toward a side opposite from the outer tube 4 (a side opposite from the tubular member), and inclines such that the distal end the reinforcing extension piece 81 approaches the inner tube (shaft member) 5. The reinforcing ring 80 is arranged in the fitting part 70, whereas the reinforcing extension piece 81 is arranged in the dust lip 71.

In such a seal member 7, the proximal end portion of the dust lip 71 located on the fitting part side (the lower side in FIG. 3) is reinforced by the reinforcing extension piece 81 of the metal insert 8. This makes it possible to guide the dust lip 71 such that the distal end portion of the dust lip 71 is oriented toward an inner tube side (inward), even if the dust lip 71 has a sufficient length and an angle of inclination thereof with respect to the inner tube 5 is small. Consequently, a decrease in conformity with the inner tube (shaft member) 5 and recurvation can be suppressed without attaching a garter spring to the dust lip 71.

Furthermore, accumulation of foreign substances as in the case of the garter spring can be prevented since the reinforcing extension piece 81 is covered by the elastic body 9. Moreover, the cost can be reduced, and there is no need to increase the thickness of the distal end portion of the dust lip 71 to mount the garter spring since the garter spring can be eliminated. Therefore, accumulation of foreign substances on the distal end of the dust lip 71 can be prevented even though a distal end of the dust lip 71 is oriented upward.

Furthermore, the seal member 7 includes the annular stopper part 72 which projects from the end portion of the fitting part 70 on a side opposite from the outer tube 4 (a side opposite from the tubular member) toward an outer circumferential side. The metal insert 8 includes the reinforcing flange piece 82 having a shape of an annular plate. The reinforcing flange piece 82 projects from the end portion of the reinforcing ring 80 on a side opposite from the outer tube 4 toward an outer circumferential side. The reinforcing flange piece 82 is arranged in the stopper part 72.

In this way, the reinforcing flange piece 82 of the metal insert 8 extends to and reinforces the stopper part 72. Accordingly, the strength of the stopper part 72 can be enhanced compared to a case where the reinforcing flange piece 82 is not provided.

Furthermore, the metal insert 8 is formed such that the reinforcing extension piece is formed by bending an inner circumferential portion of a washer having a shape of an annular plate in a direction perpendicular to an outer circumferential portion of the washer, and the reinforcing extension piece 81 is formed by obliquely elongating the bent portion inward. The inner circumferential portion and the outer circumferential portion of the washer serve as the reinforcing ring 80 and the reinforcing flange piece 82, respectively.

Therefore, a process for forming the metal insert 8 including the reinforcing ring 80, the reinforcing extension piece 81 and the reinforcing flange piece 82 can be simplified.

Furthermore, the operational effects achieved by the seal member 7 provided with the sub-dust lip 73, and the operational effects achieved by a front fork provided with the seal member 7, are similar to those achieved by the above-described first embodiment.

The embodiments of the present invention have been described above; however, the above-described embodiments merely indicate some examples of the application of the present invention with no intention to limit the technical scope of the present invention to the specific configurations of the above-described embodiments.

For example, while the seal members 1, 7 are used in a front fork in the above-described embodiments, the present embodiments are also applicable to a case where the seal members 1, 7 are used in other shock absorbers and cylinder devices for vehicles.

Furthermore, while the seal members 1, 7 according to the above-described embodiments have a double-lip structure with the dust lips 11, 71 and the sub-dust lips 13, 73 for scraping off foreign substances adhering to the outer circumference of the inner tube 5, which is the shaft member, the seal members 1, 7 may have a single-lip structure by eliminating the sub-dust lips 13, 73.

Furthermore, the seal members 1, 7 may include, in place of the sub-dust lips 13, 73, oil lips which extend from the fitting parts 10, 70 in a direction opposite to the dust lips 11, 71 (toward an outer tube side) such that a diameter of inner circumferences of the oil lips gradually decrease, with distal end portions of the oil lips sliding on the outer circumference of the inner tube (shaft member) 5. Such configurations of the seal members can be selected as appropriate.

The present application claims a priority of Japanese Patent Application No. 2013-038675 filed with the Japan Patent Office on Feb. 28, 2013, and all the contents of which are hereby incorporated by reference.

The invention claimed is:

1. A seal member, which is formed of a metal insert and an elastic body covering the metal insert, and seals a gap between a tubular member and a shaft member axially movably inserted into the tubular member, the seal member comprising:

an annular fitting part which fits on an inner circumference of the tubular member; and an annular dust lip which extends from the fitting part toward a side opposite from the tubular member, a diameter of an inner circumference of the dust lip gradually decreases, with a distal end portion of the dust lip sliding on an outer circumferential surface of the shaft member, wherein the metal insert includes a reinforcing ring and a reinforcing extension piece, the reinforcing ring standing along the inner circumference of the tubular member, and the reinforcing extension piece extending from the reinforcing ring toward a side opposite from the tubular member and inclining such that a distal end of the reinforcing extension piece approaches the shaft member, and the reinforcing ring is arranged in the fitting part, and the reinforcing extension piece is arranged in a proximal end portion of the dust lip.

2. The seal member according to claim 1, wherein the reinforcing extension piece is formed into an annular shape and a diameter of the reinforcing extension piece gradually decreases toward the distal end thereof.

3. A front fork provided with the seal member according to claim 1, the front fork comprising:

an outer tube serving as the tubular member; and an inner tube serving as the shaft member, the inner tube being movably inserted into the outer tube, wherein the seal member seals the gap between the outer tube and the inner tube.

4. A seal member, which is formed of a metal insert and an elastic body, covering the metal insert and seals a gap between a tubular member and a shaft member axially movably inserted into the tubular member, the seal member comprising:

an annular fitting part which fits on an inner circumference of the tubular member;

an annular dust lip which extends from the fitting part toward a side opposite from the tubular member, a diameter of an inner circumference of the dust lip gradually decreasing, with a distal end portion of the dust lip sliding on an outer circumferential surface of the shaft member; and an annular stopper part which projects from an end portion of the fitting part on a side opposite from the tubular member toward an outer circumferential side, wherein the metal insert includes a reinforcing ring, a reinforcing extension piece, and a reinforcing flange piece having a shape of an annular plate, the reinforcing ring standing along the inner circumference of the tubular member, the reinforcing extension piece extending from the reinforcing ring toward a side opposite from the tubular member and inclining such that a distal end of the reinforcing extension piece approaches the shaft member, and the reinforcing flange piece projecting from an end portion of the reinforcing ring on a side opposite from the tubular member toward an outer circumferential side, the reinforcing ring is arranged in the fitting part, the reinforcing extension piece is arranged in the dust lip, and the reinforcing flange piece is arranged in the stopper part, and the reinforcing extension piece is formed into an annular shape and a diameter of the reinforcing extension piece gradually decreases toward the distal end thereof.

5. The seal member according to claim 4, wherein the metal insert is formed such that the reinforcing extension piece is formed by bending an inner circumferential portion of a washer having a shape of an annular plate in a direction perpendicular to an outer circumferential portion of the washer and by obliquely elongating the bent portion inward, and the inner circumferential portion and the outer circumferential portion serve as the reinforcing ring and the reinforcing flange piece, respectively.

6. A front fork provided with the seal member according to claim 4, the front fork comprising:

an outer tube serving as the tubular member; and an inner tube serving as the shaft member, the inner tube being movably inserted into the outer tube, wherein the seal member seals the gap between the outer tube and the inner tube.

7. A seal member, which is formed of a metal insert and an elastic body covering the metal insert, and seals a gap between a tubular member and a shaft member axially movably inserted into the tubular member, the seal member comprising:

an annular fitting part which fits on an inner circumference of the tubular member;

an annular dust lip which extends from the fitting part toward a side opposite from the tubular member, a diameter of an inner circumference of the dust lip gradually decreasing, with a distal end portion of the dust lip sliding on an outer circumferential surface of the shaft member; and an annular stopper part which projects from an end portion of the fitting part on a side opposite from the tubular member toward an outer circumferential side, wherein the metal insert includes a reinforcing ring, a reinforcing extension piece, and a reinforcing flange piece having a shape of an annular plate, the reinforcing ring standing along the inner circumference of the tubular member, the reinforcing extension piece extending from the reinforcing ring toward a side opposite from the tubular member and inclining such that a distal end of the reinforcing extension piece approaches the shaft member, and the reinforcing flange piece projecting from an end portion of the reinforcing ring on a side opposite from the tubular member toward an outer circumferential side, the reinforcing ring is arranged in the fitting part, the reinforcing extension piece is arranged in the dust lip, and the reinforcing flange piece is arranged in the stopper part, and the metal insert is formed such that the reinforcing extension piece is formed by bending an inner circumferential portion of a washer having a shape of an annular plate in a direction perpendicular to an outer circumferential portion of the washer and by obliquely elongating the bent portion inward, and the inner circumferential portion and the outer circumferential portion serve as the reinforcing ring and the reinforcing flange piece, respectively.

8. A front fork provided with the seal member according to claim 7, the front fork comprising:

an outer tube serving as the tubular member; and an inner tube serving as the shaft member, the inner tube being movably inserted into the outer tube, wherein the seal member seals the gap between the outer tube and the inner tube.

* * * * *